United States Patent [19]

Stephens

[11] Patent Number: 5,029,648

[45] Date of Patent: Jul. 9, 1991

[54] METHOD AND APPARATUS FOR PROTECTING THE HOOVES OF HORSES FROM CONCUSSIVE FORCES

[76] Inventor: Dennis N. Stephens, 19041 SW. Indian Springs Cir., Lake Oswego, Oreg. 97035

[21] Appl. No.: 404,969

[22] Filed: Sep. 8, 1989

[51] Int. Cl.⁵ .............................................. A01L 7/02
[52] U.S. Cl. ...................................... 168/12; 168/28; 168/14
[58] Field of Search ........................ 168/4, 12, 14, 28; 428/280

[56] References Cited

U.S. PATENT DOCUMENTS

| | | | |
|---|---|---|---|
| 461,160 | 10/1891 | Meitzler | 168/28 |
| 479,912 | 8/1892 | Mooney | 168/12 |
| 576,559 | 2/1897 | Dix . | |
| 854,034 | 5/1907 | Handy et al. | 168/12 |
| 914,003 | 3/1909 | Woolverton . | |
| 1,131,064 | 3/1915 | Kopf . | |
| 1,273,731 | 7/1918 | Button . | |
| 1,338,986 | 5/1920 | Kent . | |
| 2,991,536 | 7/1961 | Moler | 428/280 X |
| 3,302,723 | 2/1967 | Renkenberger et al. | 168/4 |
| 4,513,825 | 4/1985 | Murphy | 168/12 |

OTHER PUBLICATIONS

Reference book entitled "FELT" prepared by Chas. W. House & Sons, Inc.
Mechanical Felt & Textiles Co., Inc. literature sheet.
Federal Specification-Felt Sheet: Cloth, Felt, Wool, Pressed-C-F-206C.
Reference article prepared by the Northern Textile Association entitled "Felt-The Versatile Design Solution".
Northern Textile Assocaition Wool Felt Standard Specifications Sheet FS14-68/71.
Article from *Equus* (vol. 141, p. 44) entitled "Weighing Technology's Role".
Article from *Equus* entitled (vol. 141, pp. 27-30) "Spring-Loaded Shoes".

Primary Examiner—Robert P. Swiatek
Attorney, Agent, or Firm—Jay K. Malkin

[57] ABSTRACT

A method and apparatus for protecting the hooves of a horse from concussive forces are described. A pad manufactured of woven felt is fixedly secured between each of the horse's hooves and a horseshoe. The pad has a size and shape approximating that of the horseshoe, and has a preferred thickness of about 0.125-0.250 inches, a surface density of about 30.0-68.0 ounces/square yard, and a density of about 0.218-0.304 ounces/cubic inch. In a preferred embodiment, the pad is first attached to the horseshoe followed by attachment of the horseshoe and pad to the hoof. Any excess portions of the pad extending beyond the edges of the horseshoe are trimmed off.

38 Claims, 1 Drawing Sheet

METHOD AND APPARATUS FOR PROTECTING THE HOOVES OF HORSES FROM CONCUSSIVE FORCES

BACKGROUND OF THE INVENTION

The present invention generally relates to a shock-absorbing method and apparatus for protecting the hooves of a horse, and more particularly to a protective pad fixedly positioned between each hoof of the horse and a horseshoe for absorbing concussive forces.

Protecting a horse's hooves from physical shock and damage is an important consideration, especially with respect to horses involved in racing and other performance activities. Metal horseshoes have been used for many years to prevent excessive hoof wear and to evenly distribute the load carried by the horse. While some of the load is absorbed by the torso of the horse (e.g. the shoulder and pastern regions), most of it is absorbed by the hooves. Tests have shown that about 2600 lb./sq. in. are imposed on each hoof of an average horse when running at 30 MPH.

A horse's hoof normally requires constant care and attention. Excessive, uncontrolled forces applied to the hooves (commonly known as "concussive" forces) may cause disease, lameness, and fatigue. Specifically, uncontrolled forces exerted on the hooves may result in the onset of thrombosis, osteochrondosis, ischemia, sole bruises, corns, shin shanks, and laminitis. Laminitis is caused by a variety of factors, including strain exerted on the ligamentous attachments holding the navicular bone in position. Thrombosis and ischemia involve circulation disturbances, both of which may be produced by concussive forces exerted on the hooves. It is therefore important that the hooves be protected from concussive forces as effectively as possible.

To accomplish protection, pads have been developed for placement between a horse's hooves and metal horseshoes. There are "full pads" which cover the entire surface of the horse's hoof, and "rim pads" which only cover the outer, peripheral regions of the hoof. In the past, both pads have been manufactured from various materials. These materials include leather, rubber, and polyurethane. For example, rubber-type pads are described in U.S. Pat. Nos. 576,559 and 1,273,731. U.S. Pat. No. 1,131,064 involves a leather pad. A composite leather-rubber pad is illustrated in U.S. Pat. 1,338,986. Additional pads are presented in U.S. Pat. Nos. 914,003 and 4,513,825. The 4,513,825 Patent specifically involves a pad manufactured from microcellular urethane foam. In addition, pads have been produced from pressed felt materials.

However, most of the construction materials described above (including pressed felt) are subject to destructive compression during use, thereby minimizing pad effectiveness and lifespan. Accordingly, a need remains for a durable pad which is resistant to destructive compression, and effectively protects a horse's hooves from concussive forces. The present invention satisfies this need, as described herein below.

SUMMARY OF THE INVENTION

It is an object of the present invention to provide a method and apparatus for protecting the hooves of a horse from concussive forces.

It is another object of the invention to provide a method and apparatus for protecting the hooves of a horse from concussive forces which involve the use of a specially constructed shock-absorbing pad.

It is another object of the invention to provide a shock-absorbing pad which is highly durable and resistant to destructive compression.

It is a further object of the invention to provide a shock-absorbing pad which is manufactured from inexpensive, readily available materials.

It is an even further object of the invention to provide a shock-absorbing pad which is readily produced using a minimal number of process steps.

It is a still further object of the invention to provide a shock-absorbing pad which is easily secured in position between a horse's hoof and a horseshoe so that maximum protection of the hoof is achieved.

In accordance with the foregoing objects, a method and apparatus for protecting the hooves of a horse from concussive forces is described herein. Specifically, a pad manufactured from woven felt is fixedly secured between each of the horse's hooves and a horseshoe. The pad has a size and shape approximating that of the selected horseshoe, and has a preferred thickness of about 0.125–0.250 inches, a surface density of about 30.0–68.0 ounces/square yard, and a density of about 0.218–0.304 ounces/cubic inch. In a preferred embodiment, the pad is first attached to the horseshoe, followed by attachment of the horseshoe and pad to the hoof. Excess portions of the pad extending beyond the edges of the horseshoe are subsequently trimmed off. The pad is highly durable, and offers markedly superior resistance to destructive compression compared with pads manufactured from other materials, including pressed felt.

These and other objects, features, and advantages of the invention shall be described below in the following Detailed Description of a Preferred Embodiment and Brief Description of the Drawings.

DETAILED DESCRIPTION OF A PREFERRED EMBODIMENT

Figure 1:
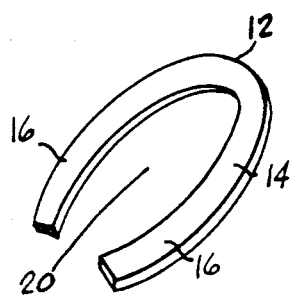
FIG. 1 is a perspective view of a shock-absorbing rim pad produced in accordance with the present invention.

The present invention involves a method and apparatus for effectively protecting a horse's hooves from concussive forces. With reference to FIG. 1 a rim pad 12 produced in accordance with the invention is illustrated. The rim pad 12 includes a body portion 14 which is arcuate in configuration and approximates the shape of a horseshoe. Specifically, the body portion 14 includes dual leg sections 16 with an open zone 20 therebetween. In a preferred embodiment, the body portion 14 is at least as large or larger than the horseshoe with which it is used for the reasons described in detail below.

In order to achieve superior durability and stress resistance, the body portion 14 is made from a product known as "woven felt." Woven felt is commercially manufactured by Chas. W. House and Sons, Inc. of Unionville Connecticut, Nordifa Industri AB of Sweden, and various other companies. Woven felt is normally composed of between about 75-100% wool. In products having less than 100% wool, the balance may consist of rayon, nylon, and/or other sythetic fibers. To produce woven felt, raw fibers are first cleaned, optionally blended with other wool fibers or synthetic materials, and then combed into an endless piece of soft yarn or "roving." This product is then spun and wound onto bobbins. Thereafter, the woven product is produced using weaving looms which create a dense, sheet-like material. This material is ultimately treated with chemicals to accomplish shrinkage, followed by washing and napping using heavy rollers with teasels. The product is then dried and sheared as desired to produce a highly resilient and durable material which is capable of maintaining most of its original thickness despite the repeated application of compressive force thereto. In addition, woven felt does not fray even after repeated use in high stress conditions.

Woven felt is entirely different from pressed felt in terms of structure, durability, and compression resistance. Pressed felt is normally produced from wool or a combination of wool and synthetic fibers which are not woven in a loom or similar apparatus, but instead are mechanically compressed. According to the Felt Manufacturers Council of the Northern Textile Association, felt (which would include pressed felt) is defined as A textile composed wholly of any one, or a combination of new, reprocessed, or reused wool fibers physically interlocked by the inherent felting properties of wool and produced by a suitable combination of mechanical work, chemical action, moisture, and heat, but without weaving. knitting, stitching, thermal bonding, or adhesives. (Wool Felt Standard Specifications #FS14-68/71, Section 3.1) This definition would exclude woven felt, but include pressed felt as indicated above. Pressed felt is especially vulnerable to destructive compression and has proven to be minimally effective when used as a protective pad for horse hooves. The clear and convincing superiority of woven felt as a hoof-protecting pad will be discussed in greater detail below in the section entitled "Experimental Tests."

Figure 7:
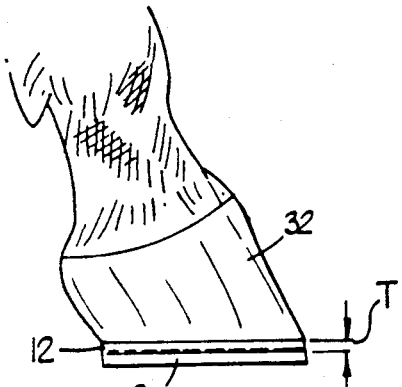
FIG. 7 is a side view of the pad of FIG. 1 mounted in position between the hoof of a horse and a horseshoe.

In a preferred embodiment, the body portion 14 of the pad 12 will have a uniform thickness "T" as illustrated in FIG. 7 of about 0.125-0.250 inches, with an optimum range of about 0.186-0.206 inches. Thickness as described herein is determined in accordance with ASTM (American Society of Testing Materials) testing method #D-461-77. Specifically, measurements are made using a dial micrometer having a specimen-supporting anvil, a circular presser foot acting under a deadweight load, and a dial graduated to read in increments of 0.001 inches. The supporting anvil has a flat surface with a minimum diameter of 2.0 inches, and is in the same plane as the presser foot. The presser foot has an area of 1 square inch (plus or minus 0.0025 square inches) and is 1.129 inches in diameter. It is sufficiently thick to ensure rigidity, and the edges are rounded off with a radius of 0.016 inches (plus or minus 0.001 inches.) The surface of the presser foot is actuated by a freely-acting total deadweight of 10 ounces (plus or minus 0.5 ounces.) However, when the felt has a density less than 0.08 ounces/cubic inch, the deadweight load is 2 ounces (plus or minus 0.1 ounces.)

The woven felt used in the body portion 14 of pad 12 shall have a preferred surface density (mass per unit area) of about 30.0-68.0 ounces/square yard (58.0=optimum.)

In addition, the woven felt described herein shall preferably have a density of about 0.218-0.304 ounces/cubic inch (0.228=optimum.) The density is calculated using the following formula:

$$\text{Density} = \frac{(SD)}{(1296)(T)}$$

SD=surface density in ounces/sq. yd.
T=thickness in inches
1296 square inches=1 square yard The standards for determining density, surface density, thickness, and other characteristics of woven felt are presented in ASTM method Nos. D-76-77; D-123-77A; D-276-77; D-461-77; D-1777-64; and D-1910-64. Surface are both measures of weight, yet are exclusive of each other. Density is a measure of weight per volume unit, while surface density is a measure of weight per area unit. Both of these parameters are important when defining products made of felt.

Figure 3:
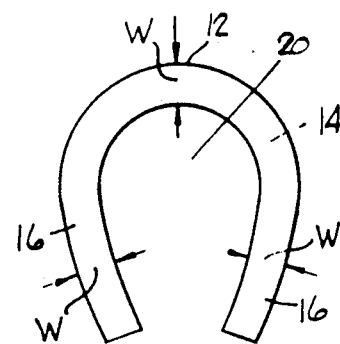
FIG. 3 is a top view of the pad of FIG. 1.

To produce the body portion 14 of the pad 12, a sheet of woven felt having the characteristics described above is cut using a die apparatus known in the art (e.g. a travelling head press, clicker, or other conventional press-type systems used in the gasket industry.) As previously indicated, the size of the body portion 14 will preferably be equal to or greater than the size of the horseshoe with which it is used. For most purposes, the body portion 14 will have a preferred width "W" (FIG. 3) of about 0.750 inches, although this value may be suitably varied.

Figure 2:
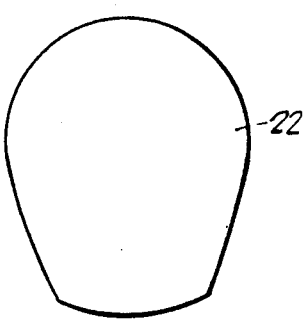
FIG. 2 is a perspective view of a shock-absorbing full pad produced in accordance with the invention.

In addition to the rim pad structure shown in FIG. 1, the present invention shall also include the production of a full pad 22 shown in FIG. 2. The full pad 22 is essentially oval in configuration and does not have the open zone 20 and leg sections 16 of the pad 12. The full pad 22 is designed to cover the entire surface of the hoof. However, the other characteristics of the full pad 22, including the type of woven felt from which it is constructed are the same as those of rim pad 12.

Figure 6:
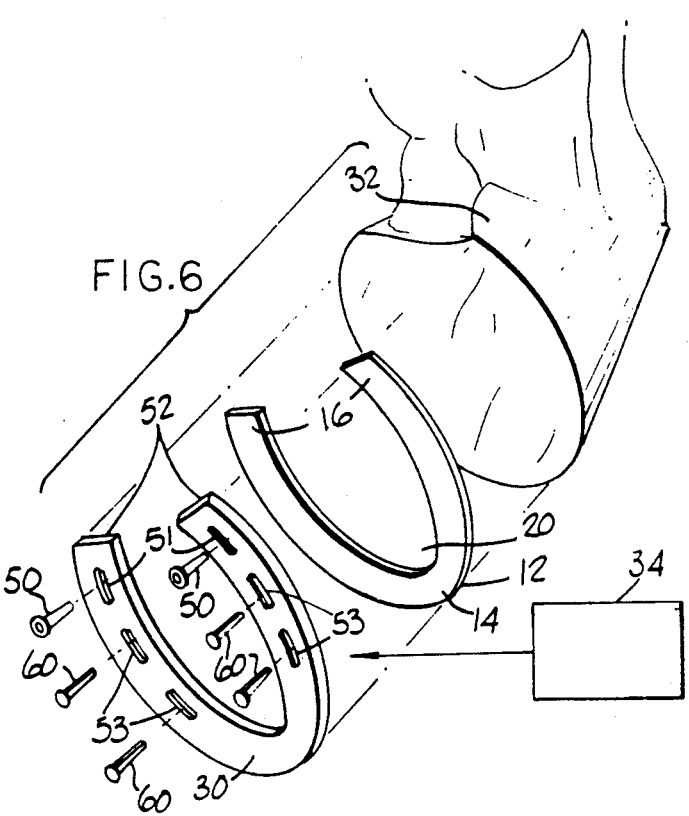
FIG. 6 is an exploded perspective view of the pad of FIG. 1 being mounted in position between the hoof of a horse and a horseshoe.

With reference to FIGS. 6 and 7, attachment of the pad 12 to a horseshoe 30 and hoof 32 is illustrated. In a preferred embodiment, the pad 12 is first secured to the horseshoe 30 using an adhesive 34 which is preferably applied to the pad 12, horseshoe 30, or both. An exemplary adhesive is sold under the name Barge Cement by the Pierce and Stevens Co. Other adhesives usable in the invention include spray adhesives sold by the 3-M company (designation #s 76, 77, or 95.) All of the adhesives listed above are simple contact cement products with a high tack and short setting time.

Figure 4:
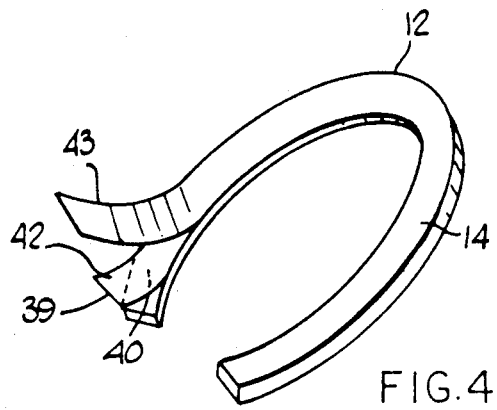
FIG. 4 is a perspective view of the pad of FIG. 1 attached to an adhesive-coated sheet and backing member for use in securing the pad to a horseshoe.
Figure 5:
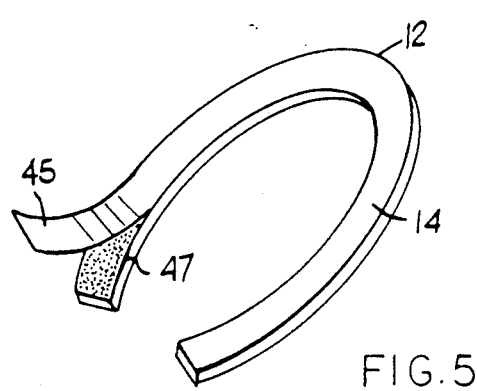
FIG. 5 is a perspective view of the pad of FIG. 1 attached to a backing member with an adhesive film thereon for use in securing the pad to a horseshoe.

In an alternative embodiment of the invention, the pad 12 may be manufactured using a pre-fabricated peel-off adhesive. With reference to FIG. 4, a pad 12 is shown with an adhesive-coated sheet 39 attached thereto having a size approximating that of the pad 12. The sheet 39 has two sides 40, 42 which are both coated with adhesive. The side 40 is secured to the pad 12 as illustrated. The side 42 is temporarily secured to a backing member 43 which is removable. When the pad 12 is ready for use, the backing member 43 is simply removed and discarded, thereby exposing side 42 which may then be adhered to a horseshoe as desired. The sheet 39 and backing member 43 are commercially available as an integrated structure from numerous companies, including the 3M company of Minneapolis, MN (product #401.) In addition, commercial products are available which consist of a rubber-like adhesive film on a backing member (without the use of a sheet 39.) With reference to FIG. 5, a pad 12 is shown secured to backing member 45 having an adhesive film 47 thereon. The film 47 adheres to the pad 12, with the backing member 45 being subsequently peeled off. A commercially available backing member 45 and attached film 47 is also produced by the 3M Company (product #'s 467 MP and 927.)

Next, rivets 50 (preferably 2) are inserted through openings 51 nearest the ends 52 of the horseshoe 30, the rivets 50 also passing through the pad 12 (FIG. 6.) The ends of the rivets 50 which emerge from the pad 12 are then flattened with a hammer or the like. Exemplary rivets 50 usable in the invention include size 12 standard flat head copper rivets (¾ in. long.) However, larger or smaller rivets 50 may be used, depending on the size of the horse and horseshoe involved. Use of the ivets 50 as described herein eliminates slippage of the pad 12 during application and use of the pad 12.

In a further alternative embodiment of the invention, it is also possible for the pad 12 to be first secured to the hoof 32 by adhesive or the like, followed by attachment of the horseshoe 30 to the hoof 32. Nonetheless, it is preferred that the pad 12 be first affixed to the horseshoe 30 as described above.

Finally, the horseshoe 30 and attached pad 12 are secured to the horse's hoof using conventional nails 60 which pass through openings 53 shown in FIG. 6 The number and size of the nails 60 which are used may be selectively varied, depending on the size of the horseshoe involved. For example, if the pad 12 is used with a size 5 racing horseshoe, size 3 ½ nails (standard U.S. size system) are used.

As previously indicated, it is desired that the body portion 14 of the pad 12 have a size which is equal to or slightly larger than that of the horseshoe with which it is used. This ensures that the pad 12 will effectively protect all parts of the hoof from concussive forces passing through the horseshoe. It is also beneficial if the pad 12 is slightly larger than the horseshoe, since this will enable the pad 12 to be precisely trimmed once it is mounted in position. Specifically, any portions of the pad 12 which extend beyond the outer edges of the horseshoe may be suitably trimmed to provide a clean and uniform appearance.

If a full pad 22 is used, it will be mounted using the same basic procedures described above.

FIG. 7 shows a side view of the pad 12 securely mounted in position between the horseshoe 30 and hoof 32. Using this arrangement of components, the hoof 32 is protected by concussive forces in a highly effective manner. Moreover, the woven felt used to produce the pad 12 offers a substantially improved degree of durability compared with other materials, including pressed felt. Detailed tests involving pads constructed of woven felt are provided below in the following section entitled "Experimental Tests."

EXPERIMENTAL TESTS

Stress and fatigue tests were conducted on pads manufactured from woven felt in accordance with the invention, as well as other materials. A description of these tests is as follows:

A. Load Deflection Test

The equipment used for this test included the following items:

1. Milling machine (Excello Co. Model 602)
2. Load cell (Lebow Co. Model 3187-SK, 5000 lb. cap.)
3. Strain Gauge unit (Daytronic Co. Model 3270)

The following rim pads were used in the test:

1. Woven felt test rim pad manufactured of wool (Chas. House and Sons, code #1173-58A) and having a density of 0.228 ounces/cu. in., a thickness (T) of 0.196 in. (plus or minus 0.006 in.), a surface density of 58.0 ounces/sq. yd. (plus or minus 3.9 ounces/sq. yd.), and a width (W) of 0.750 inches.
2. SAE grade F-2 pressed industrial felt rim pad having a thickness (T) of about 3/16 (0.19) in.
3. SAE grade F-3 pressed industrial felt rim pad having a thickness (T) of about ⅛ (0.125) in.
4. SAE grade F-3 pressed industrial felt rim pad having a thickness (T) of about 3/16 (0.19) in.
5. polyurethane rim pad having a thickness of about 3/16 (0.19) in.
6. white open cell rubber rim pad having a thickness of about 3/16 (0.19) in.

The overall size of pads 2-6 closely approximated that of pad 1.

To conduct the tests, a flat platen was placed on the table of the milling machine. The pad to be tested was placed on the platen. A second platen was placed on the test pad. The load cell was then inserted between the upper platen and the spindle housing of the milling machine. The strain gauge indicator and the height indicator of the milling machine were set to zero. Thereafter, the table of the milling machine was raised in increments of 0.005 in., and the load imposed on the pad recorded from the strain gauge. This procedure was continued until the pad could no longer deform. The test results for the above samples are described below in Table 1:

TABLE 1

| PAD # | DEFLECTION (IN.) | LOAD (PSI) | % TOTAL LOAD |
|---|---|---|---|
| 1 (INVENTION) | 0.075 | 759.2 | 29.2 |
| 2 | 0.068 | 621.4 | 23.9 |
| 3 | 0.04 | 145.6 | 5.6 |
| 4 | 0.09 | 614.9 | 23.65 |
| 5 | 0.045 | 340.0 | 13.0 |
| 6 | 0.010 | 176.0 | 6.7 |

The term "deflection" involves the reduction in thickness (compressability) of the test pads upon the application of a load thereto. For example, a pad having an initial thickness of 0.200 in. which compresses down to a thickness of 0.150 in. after a selected load is applied has a deflection value of 0.050 in. The term "load" involves the amount of weight exerted on the test pad until it no longer deforms. The "% total load" involves the amount of force effectively absorbed by the test pads, and provides an operative indication of how effective a pad is in absorbing concussive forces. The % total load is calculated using the following formula:

$$\% \text{ total load} = \frac{(\text{load in lb./sq. in.})}{(2600 \text{ lb./sq. in.})} \times (100)$$

The 2600 lb./sq. in figure listed above is an industry-wide standard value obtained from a research study at Washington State University which involves the amount of force imposed on the hoof of an average horse running at 30 mph.

To illustrate how the above formula is used, pad #1 (which was constructed of woven felt in accordance with the invention) had a % total load value calculated as follows:

$$\% \text{ total load} = \frac{(759.2 \text{ lb./sq. in.})}{(2600 \text{ lbs./sq. in.})} \times (100)$$
$$= 29.2$$

Accordingly, if 2600 lb./sq. in. is imposed on the hoof of a horse, the use of a new pad manufactured in accordance with the present invention will reduce this force by 29.2% to a value of 1840.8 lb./sq in. As illustrated in Table 1, the % total load of pad #1 (the present invention) was greater than any of the other test pads in Table 1. This includes pad #2 and #4 which were manufactured of pressed felt. Specifically, pad #2 and #4 would reduce the 2600 lb./sq. in. force value described herein to only about 1978.6 and 1983.8 lb./sq. in. respectively compared with 1840.8 lb./sq. in. listed above for pad #1. This difference is substantial, and clearly indicates the superior ability of woven felt pads to absorb concussive forces.

B. Fatigue Test

The equipment used in this test involved a 5 ton punch press unit capable of operating at 154 rpm. This speed approximates that of a horse running at 16 meters/second on a treadmill. A woven felt test pad (which was manufactured in accordance with the specifications described in the Load Deflection Test) was glued to a standard size 5 horseshoe. The toe grab of the horseshoe was ground off so that the horseshoe could be positioned in a flat orientation relative to the punch press. The horseshoe was bolted to a riser plate and clamped to the platen of the punch press. The ram of the punch press was set to deflect the horseshoe and pad by 0.075 inches (in accordance with the Load Deflection Test described above.) Over a period of five days, the shoe and pad were subjected to multiple compressive cycles until failure.

The test described above was also repeated in an identical manner relative to pad #4, #5, and #6 listed in Table 1 above. The ram of the punch press was set to deflect the horseshoe and pad in accordance with the deflection values listed in Table 1. The comparative test results are listed below in Table 2:

TABLE 2

| PAD # | APPROX. NO. OF CYCLES (STRIDES) BEFORE FAILURE |
|---|---|
| 1 (INVENTION) | 434,000 |
| 4 | 150,000 |
| 5 | 40,000 |
| 6 | 40,000 |

The term "failure" as indicated in Table 2 involves a level of structural deterioration and permanent deformation at which the pad would be unsuitable for use as a protective device. With continued reference to Table 2, the woven felt pad (#1) lasted much longer than pads made of other materials, including pressed felt (pad #4). Even after 434,000 strides (which resulted in a permanent reduction in thickness of about 20%), the woven felt pad had a deflection value of 0.06 in., a load value of 440 lb./sq. in. and a % total load of 16.92%. This indicates that the woven felt pad of the present invention was still absorbing 440 lb./sq. in. or 16.92% of the total load, and still working at 57% of its original capacity (440 lb./sq. in divided by the load value of the pad when new (759.2 lb./sq. in.) as stated in Table 1.)

The results presented in Tables 1 and 2 clearly indicate that pads manufactured in accordance with the invention are markedly superior in terms of longevity and force absorbance compared with other pads, including those manufactured of pressed felt and polyurethane.

Having herein described a preferred embodiment of the present invention, it is anticipated that suitable modifications may be made thereto by those skilled in the art within the scope of the invention. Thus, the invention shall only be construed in connection with the following claims:

I claim:

1. A shock absorbing pad adapted for attachment between the hoof of a horse and a horse shoe comprising a body portion manufactured of woven felt, said body portion being sized to fit between said hoof and said horseshoe, said body portion further comprising an adhesive-coated sheet secured thereto, said sheet having first and second sides both coated with adhesive, said first side being secured to said pad, and said second side being removably secured to a detachable backing member.

2. The pad of claim 1 wherein said body portion is configured in the shape of a horseshoe.

3. The pad of claim 1 wherein said woven felt is comprised of wool.

4. The pad of claim 1 wherein said body portion has a thickness of about 0.125–0.250 inches.

5. The pad of claim 1 wherein said body portion has a surface density of about 30.0–68.0 ounces/square yard.

6. The pad of claim 1 wherein said body portion has a density of about 0218–0.304 ounces/cubic inch.

7. A shock absorbing pad adapted for attachment between the hoof of a horse and a horseshoe comprising a body portion manufactured of woven felt, said body portion having a thickness of about 0.125–0.250 inches, a surface density of about 30.0–68.0 ounces/square yard, and a density of about 0.218–0.304 ounces/cubic inch, said body portion further comprising an adhesive-coated sheet secured thereto, said sheet having first and second sides both coated with adhesive, said first side being secured to said pad, and said second side being removably secured to a detachable backing member.

8. A method for manufacturing a shock absorbing pad adapted for attachment between the hoof of a horse and a horseshoe comprising:
   obtaining a sheet of woven felt; and
   cutting a portion of said woven felt from said sheet which is sized to enable said portion to fit between said hoof and said horseshoe, said portion being used as said pad.

9. The method of claim 8 wherein said portion of said woven felt is configured in the shape of a horseshoe.

10. The method of claim 8 wherein said woven felt is comprised of wool.

11. The method of claim 8 wherein said portion of said woven felt has a thickness of about 0.125–0.250 inches.

12. The method of claim 8 wherein said portion of said woven felt has a surface density of about 30.0–68.0 ounces/square yard.

13. The method of claim 8 wherein said portion of said woven felt has a density of about 0.218–0.304 ounces/cubic inch.

14. A method for manufacturing a shock absorbing pad adapted for attachment between the hoof of a horse and a horseshoe comprising:
   obtaining a sheet of woven felt; and
   cutting a portion of said woven felt from said sheet which is sized to enable said portion to fit between hoof and said horseshoe, said portion being used as said pad and having a thickness of about 0.125–0.250 inches, a surface density of about 30.0–68.0 ounces/square yard, and a density of about 0.218–0.304 ounces/cubic inch.

15. A method for protecting the hoof of a horse from shock and concussive forces comprising:
   providing a horseshoe and a pad comprising a body portion manufactured of woven felt;
   positioning said horseshoe against the hoof of a horse with said pad therebetween; and
   securing said horseshoe to said hoof, said pad being fixedly maintained therebetween.

16. The method of claim 15 wherein said pad is secured to said horseshoe prior to said positioning of said horseshoe against said hoof.

17. The method of claim 16 wherein said pad is secured to said horseshoe using an adhesive.

18. The method of claim 15 further comprising the step of trimming off any excess portion of said pad extending beyond said horseshoe after said securing thereof to said hoof.

19. The method of claim 15 wherein said body portion is configured in the shape of a horseshoe.

20. The method of claim 15 wherein said woven felt is comprised of wool.

21. The method of claim 15 wherein said body portion has a thickness of about 0.125–0.250 inches.

22. The method of claim 15 wherein said body portion has a surface density of about 30.0–68.0 ounces/square yard.

23. The method of claim 15 wherein said body portion has a density of about 0.218–0.304 ounces/cubic inch.

24. A method for protecting the hoof of a horse from shock and concussive forces comprising:
   providing a horseshoe and a pad comprising a body portion manufactured of woven felt, said body portion having a thickness of about 0.125–0.250 inches, a surface density of about 30.0–68.0 ounces/square yard, and a density of about 0.218–0.304 ounces/cubic inch;
   securing said pad to said horseshoe;
   positioning said horseshoe having said pad secured thereto against the hoof of a horse with said pad engaging said hoof;
   securing said horseshoe to said hoof, with said pad being fixedly maintained therebetween; and
   trimming off any excess portions of said pad extending beyond said horseshoe after said securing thereof to said hoof.

25. A shock absorbing pad adapted for attachment between the hoof of a horse and a horseshoe comprising a body portion manufactured of woven felt, said body portion being sized to fit between said hoof and said horseshoe, said body portion further comprising a backing member secured thereto, said backing member having an adhesive coating thereon temporarily securing said backing member to said pad, said backing member being readily removed from said pad with said adhesive coating remaining on said pad.

26. A shock absorbing pad adapted for attachment between the hoof of a horse and a horseshoe comprising a body portion manufactured of woven felt, said body portion having a thickness of about 0.125–0.250 inches, a surface density of about 30.0–60,0 ounces/square yard, and a density of about 0.218–0.304 ounces/cubic inch, said body portion further comprising a backing member secured thereto, said backing member having an adhesive coating thereon temporarily securing said backing member to said pad, said backing member being readily removed from said pad with said adhesive coating remaining on said pad.

27. A method for manufacturing a shock absorbing pad adapted for attachment between the hoof of a horse and a horseshoe comprising:
   obtaining a sheet of woven felt;
   cutting a portion of said woven felt from said sheet which is sized to enable said portion to fit between said hoof and said horseshoe, said portion being used as said pad; and
   securing an adhesive-coated sheet to said portion of woven felt, said sheet having first and second sides both coated with adhesive, said first side being secured to said portion, and said second side being removably secured to a detachable backing member.

28. A method for manufacturing a shock absorbing pad adapted for attachment between the hoof of a horse and a horseshoe comprising:
   obtaining a sheet of woven felt;
   cutting a portion of said woven felt from said sheet which is sized to enable said portion to fit between said hoof and said horseshoe, said portion being used as said pad; and
   securing a backing member to said portion of said woven felt, said backing member having an adhesive coating thereon temporarily securing said backing member to said portion, said backing member being readily removed from said portion with said adhesive coating remaining on said portion.

29. A method for manufacturing a shock absorbing pad adapted for attachment between the hoof of a horse and a horseshoe comprising:
   obtaining a sheet of woven felt;
   cutting a portion of said woven felt from said sheet which is sized to enable said portion to fit between said hoof and said horseshoe, said portion being used as said pad and having a thickness of about 0.125–0.250 inches, a surface density of about 30.0–68.0 ounces/square yard, and a density of about 0.218–0.304 ounces/cubic inch; and
   securing an adhesive-coated sheet to said portion of woven felt, said sheet having first and second sides both coated with adhesive, said first side being secured to said portion, and said second side being removably secured to a detachable backing member.

30. A method for manufacturing a shock absorbing pad adapted for attachment between the hoof of a horse and a horseshoe comprising:
   obtaining a sheet of woven felt;
   cutting a portion of said woven felt from said sheet which is sized to enable said portion to fit between said hoof and said horseshoe, said portion being used as said pad and having a thickness of about 0.125–0.250 inches, a surface density of about 30.0–68.0 ounces/square yard, and a density of about 0.218–0.304 ounces/cubic inch; and securing a backing member to said portion of said woven felt, said backing member having an adhesive coating thereon temporarily securing said backing member to said portion, said backing member being readily removed from said portion with said adhesive coating remaining on said portion.

31. A method for protecting the hoof of a horse from shock and concussive forces comprising:

providing a horseshoe and a pad comprising a body portion manufactured of woven felt, said body portion of said pad further comprising an adhesive-coated sheet secured thereto, said sheet having first and second sides both coated with adhesive, said first side being secured to said pad, and said second side being removably secured to a detachable backing member;

positioning said horseshoe against the hoof of a horse with said pad therebetween; and securing said horseshoe to said hoof, said pad being fixedly maintained therebetween.

32. The method of claim 31 further comprising the steps of:

removing said backing member from said second side of said sheet; and placing said second side of said sheet against said horseshoe prior to said positioning of said horseshoe against said hoof of said horse, said adhesive on said second side of said sheet adhering said sheet and said pad to said horseshoe.

33. A method for protecting the hoof of a horse from shock and concussive forces comprising:

providing a horseshoe and a pad comprising a body portion manufactured of woven felt, said body portion of said pad further comprising a backing member secured thereto, said backing member having an adhesive coating thereon temporarily securing said backing member to said pad, said backing member being readily removed from said pad with said adhesive coating remaining on said pad;

positioning said horseshoe against the hoof of a horse with said pad therebetween; and securing said horseshoe to said hoof, said pad being fixedly maintained therebetween.

34. The method of claim 33 further comprising the steps of:

removing said backing member from said pad, said adhesive coating remaining on said pad; and placing said pad against said horseshoe prior to said positioning of said horseshoe against said hoof of said horse, said adhesive coating on said pad adhering said pad to said horseshoe.

35. A method for protecting the hoof of a horse from shock and concussive forces comprising:

providing a horseshoe and a pad comprising a body portion manufactured of woven felt, said body portion having a thickness of about 0.125–0.250 inches, a surface density of about 30.0–68.0 ounces/square yard, and a density of about 0.218–0.304 ounces/cubic inch, said body portion of said pad further comprising a backing member secured thereto, said backing member having an adhesive coating thereon temporarily securing said backing member to said pad, said backing member being readily removed from said pad with said adhesive coating remaining on said pad;

securing said pad to said horseshoe;

positioning said horseshoe having said pad secured thereto against the hoof of a horse with said pad engaging said hoof;

securing said horseshoe to said hoof, with said pad being fixedly maintained therebetween; and trimming off any excess portions of said pad extending beyond said horseshoe after said securing thereof to said hoof.

36. The method of claim 35 wherein said securing of said pad to said horseshoe comprises the steps of:

removing said backing member from said pad, said adhesive coating remaining on said pad; and placing said pad against said horseshoe, said adhesive coating on said pad adhering said pad to said horseshoe.

37. A method for protecting the hoof of a horse from shock and concussive forces comprising:

providing a horseshoe and a pad comprising a body portion manufactured of woven felt, said body portion having a thickness of about 0.125–0.250 inches, a surface density of about 30.0–68.0 ounces/square yard, and a density of about 0.218–0.304 ounces/cubic inch, said body portion of said pad further comprising an adhesive-coated sheet secured thereto, said sheet having first and second sides both coated with adhesive, said first side being secured to said pad, and said second side being removably secured to a detachable backing member;

securing said pad to said horseshoe;

positioning said horseshoe having said pad secured thereto against the hoof of a horse with said pad engaging said hoof;

securing said horseshoe to said hoof, with said pad being fixedly maintained therebetween; and trimming off any excess portions of said pad extending beyond said horseshoe after said securing thereof to said hoof.

38. The method of claim 37 wherein said securing of said pad to said horseshoe comprises the steps of:

removing said backing member from said second side of said sheet; and placing said second side of sheet against said horseshoe, said adhesive on said second side of said sheet adhering said sheet and said pad to said horseshoe.

* * * * *